Aug. 13, 1935.  T. L. FAWICK  2,011,401
TRANSMISSION
Filed Nov. 5, 1932  4 Sheets-Sheet 1

Inventor:
Thomas L. Fawick
By Drury, Jackson, Boettcher + Wiener
Attys.

Aug. 13, 1935.  T. L. FAWICK  2,011,401
TRANSMISSION
Filed Nov. 5, 1932     4 Sheets-Sheet 2

Inventor:
Thomas L. Fawick.
By Brown, Jackson, Boettcher & Dienner
Attys.

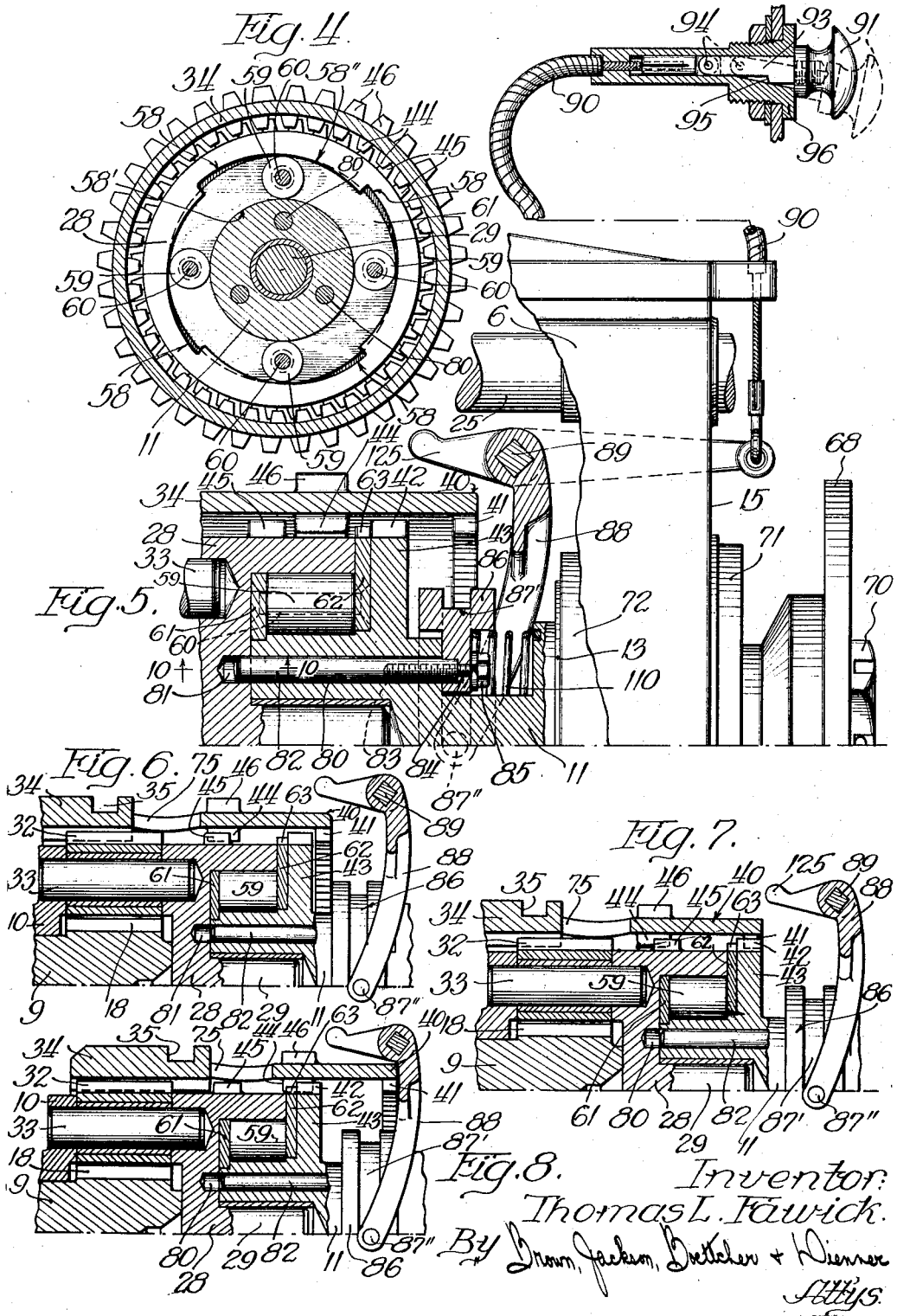

Aug. 13, 1935.   T. L. FAWICK   2,011,401
TRANSMISSION
Filed Nov. 5, 1932   4 Sheets-Sheet 4
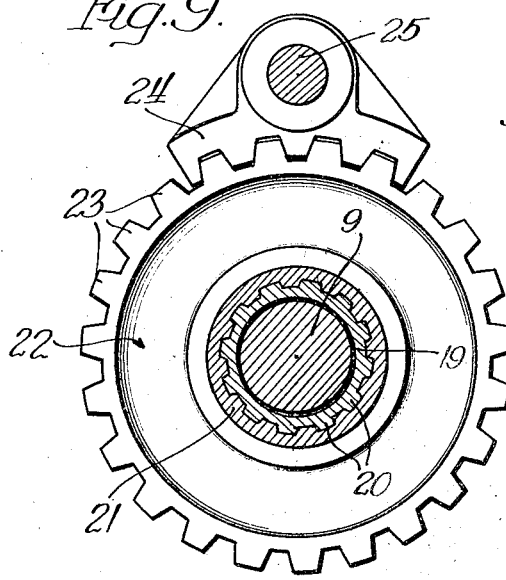
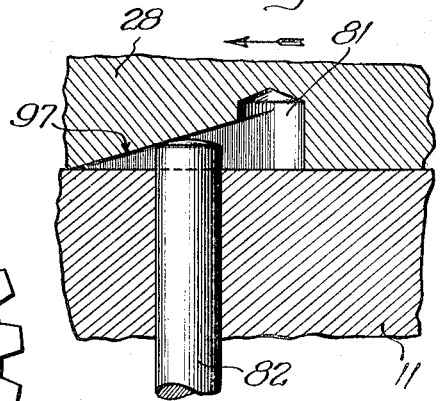
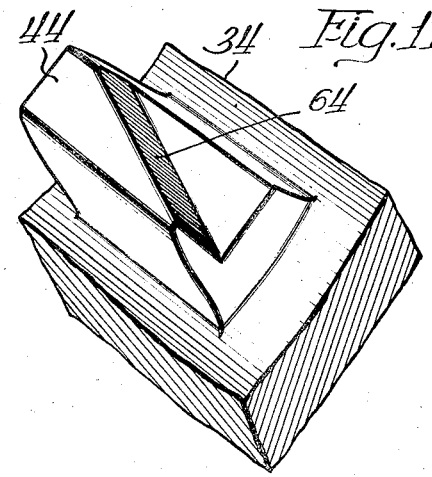
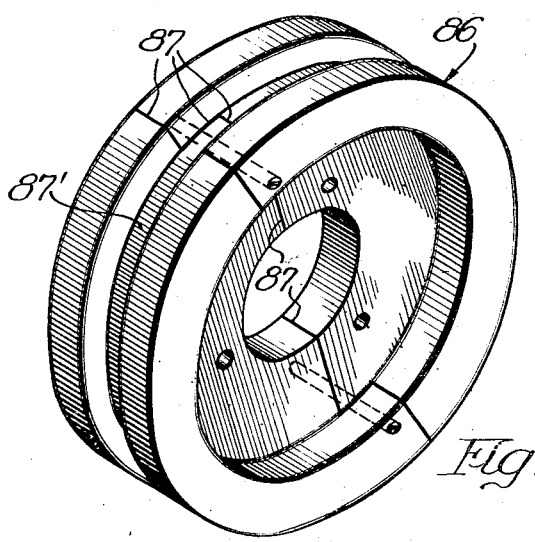
Inventor:
Thomas L. Fawick.
By Brown, Jackson, Boettcher + Wiemer
Attys.

Patented Aug. 13, 1935

2,011,401

UNITED STATES PATENT OFFICE 2,011,401

TRANSMISSION

Thomas L. Fawick, Akron, Ohio, assignor to Brown-Lipe Gear Company, Toledo, Ohio, a corporation of New York Application November 5, 1932, Serial No. 641,325

20 Claims. (Cl. 74—291)

My invention relates to transmissions for motor vehicles.

The invention is applicable to automobiles, busses, trucks, tractors and the like, and its object is to provide a short compact transmission which is light and inexpensive to manufacture, parts of small diameter and light weight being employed throughout; a transmission of this sort which is easy to operate and which has free-wheeling and a positive drive without free-wheeling in each of the forward speeds; a transmission of this sort having means for rendering the free-wheeling device inoperative in reverse; and a free-wheeling transmission without a countershaft or countershaft gears and in which no idle gears continue to be driven when the drive is direct.

The present invention may be characterized as an improvement upon the transmission illustrated and described in my prior Patent No. 1,733,786, patented October 29, 1929. It provides for free-wheeling and for a positive drive without free-wheeling in each of the forward speeds of a transmission of that type and it provides means for rendering the free-wheeling device inoperative in reverse.

The short compact character of the present transmission, in addition to reducing the weight and the cost of manufacture, enables the use of a longer propeller shaft and reduces the angular movement in this shaft.

The free-wheeling device adds but little to the bulk, the weight, and the number of parts in the transmission, and the positive drive in the forward speeds of the transmission are rendered operative selectively by means under the control of the driver. When the free-wheeling device is operative in either forward speed the car may glide or coast whenever the component of the force of gravity in the direction of the road surface on a down-grade, or the force due to momentum of the car makes it travel at a higher speed than that corresponding to engine speed. At the same time the positive drive in each forward speed enables descending grades or otherwise running in each forward speed without free-wheeling, thereby enabling use of the engine for braking purposes.

By eliminating the countershaft and countershaft gears and by not driving any idle gears when the drive is direct, noise and power losses are minimized.

The present invention is particularly adapted for use in a transmission having two speeds forward and reverse. A transmission of this type is especially suited for use with a two-speed rear axle. It is to be understood, however, that the features of this invention may appear in other types of transmissions and that use with axles other than those of the two-speed type is contemplated within the scope of this invention.

Now, in order to acquaint those skilled in the art with the manner of constructing and using a device embodying my invention, I shall describe a specific embodiment of the same in connection with the accompanying drawings in which:

Figure 4 is a cross-sectional view taken on the line 4—4 of Figure 1;

Figure 5 is an enlarged fragmentary longitudinal section through the driven member at the rear end of the transmission and showing in detail and, more or less, diagrammatically one form of means for obtaining a positive ratio drive without free-wheeling;

Figure 6 is a fragmentary and, more or less, diagrammatic section showing the position of the internal ring gear when the transmission is in direct drive forward with the free-wheeling device in operation;

Figure 7 is a view similar to Figure 6 showing the position of the internal ring gear when the transmission is in direct drive forward with the free-wheeling device out of operation;

Figure 8 is a view similar to Figures 6 and 7 and showing the position of the internal ring gear when the transmission is in reverse;

Figure 9 is a section taken on the line 9—9 of Figure 1;

Figure 10 is a detail sectional view taken on the line 10—10 of Figure 5;

Figure 11 is a fragmentary perspective view showing the tapered rearward ends of the intermediate internal clutch teeth on the ring gear; and Figure 12 is a perspective view of the shifter ring for the clutch pins for low speed forward without free-wheeling.

Figure 1:
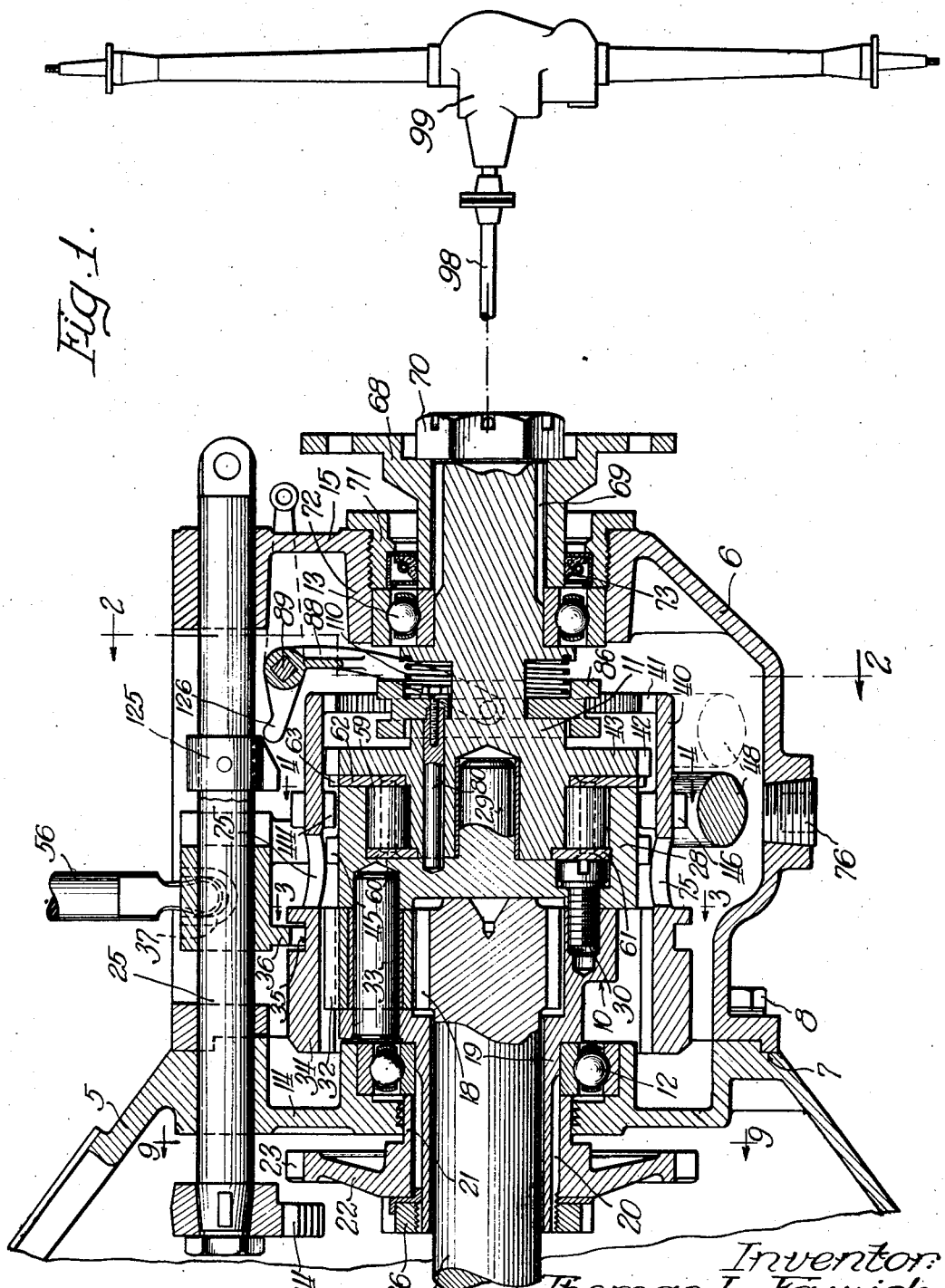
Figure 1 is a longitudinal vertical section through a transmission embodying this invention.

Referring now to the drawings, the housing of the transmission is made up in two sections; the bell housing 5, which may be bolted to the fly wheel and clutch housing of the driving motor, and the rearward housing member 6. These housing sections 5 and 6 have companion flanges piloted on each other at 7 to secure registration and are bolted together at 8.

The shaft 9 is herein termed "the driving shaft" and this shaft is preferably connected to the clutch of the driving engine. The next element in the line of drive from the driving shaft 9 to the driven shaft, which may be a propeller shaft or even a rear axle shaft, is the cage member 10. The next element in the line of drive is the driven shaft or shaft section 11. The shaft section 11 is, with respect to the driving shaft 9, a driven shaft and, with respect to the propeller shaft or rear axle shaft, it is a driving shaft section. All of these elements in the line of drive are alined with each other and piloted on or in each other so as to provide radial support for the entire line of drive throughout. The support which this line of drive secures from the housing is provided in two simple and relatively small bearings, namely, the front bearing 12 and the rear bearing 13. These bearings are preferably ball bearings so that they may take whatever endwise thrust might result from operation of the device.

To support these two bearings 12 and 13, the housing 5, 6 has walls or webs 14 and 15. All of the wearing parts are contained between the walls or webs 14 and 15, and the space between these walls or webs comprises a lubricant container open endwise between these walls.

The driving shaft 9 has a pinion 18 formed on the rear end thereof and this pinion is embraced by the cage 10. The cage 10 is formed in two parts, the front part comprising a sleeve 19 fitting upon the cylindrical part of the shaft 9 adjacent the pinion 18 and having a suitable bearing thereon. This sleeve 19 is splined externally as indicated at 20 to receive the hub 21 of the clutch disc 22, the periphery of which is provided with gear teeth 23 serving as clutch dogs to cooperate with the external gear segment 24 mounted on the shifter rod 25 and serving as a clutch member or detent. The shifter rod 25 is not subjected to torque as the form of detent 24 eliminates this.

The hub of the clutch disc 22 is held in place by a lock nut 26 which also binds the inner race of the bearing 12 in place upon the sleeve 19 of the cage 10. The other part of the cage 10 comprises a member 28 having an axially projecting bearing pin 29 which is piloted axially in the driven shaft section 11. This pin 29 has bearing support in the bearing 13.

Figure 3:
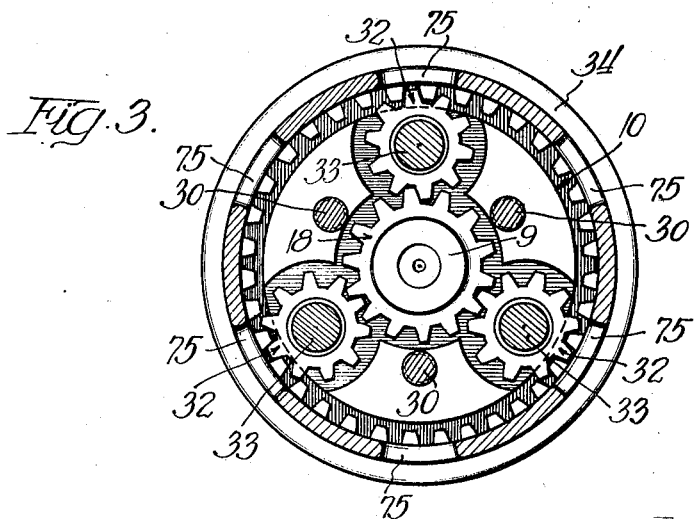
Figure 3 is a cross-sectional view through the internal ring gear taken on the line 3—3 of Figure 1 and showing the idler gears in end elevation.

The two halves of the cage 10 are suitably fastened together by screws 30 preferably at three points between the idler gears 32, these idler gears 32 being preferably equally spaced and three in number, and the forward part of the cage 10 is scalloped, as shown in Figure 3, to accommodate said idler gears. These idler gears 32 are mounted on bearing pins 33 seated at their forward ends in the forward cage member and at their rearward ends in the rearward cage member. The idlers 32 are arranged at 120° about the pinion 18 and are always in mesh with this pinion. Thus at least three full teeth are always in mesh giving exceptional strength.

Upon the outside of and in mesh with the three idler pinions 27 there is an internal ring or spool gear 34, the internal teeth on this ring gear being wide enough axially to permit this gear to be shifted axially to perform certain clutch operations, as will be explained later, without losing mesh with the idlers 32. The ring gear 34 is provided with a shifter groove 35 in which rests a shifter fork 36, this shifter fork having a hub pinned upon the shifter rod 25 and the hub of the shifter fork having a socket 37 to receive the end of a shift lever, as is well understood by those skilled in the art.

The internal ring gear 34 has a rearward cylindrical extension 40, the rear end of which has a series of clutch teeth 41, these teeth 41 being disposed annularly about the interior of the rear end of the extension 40, and cooperating when the transmission is in high speed forward without free-wheeling with external clutch teeth 42 in the periphery of the clutch disc 43 formed integral with and extending radially from the driven member 11. Forwardly of the clutch teeth 41, the extension 40 has a second series of internal clutch teeth 44 which cooperate when the transmission is in high speed forward without free-wheeling as well as when the transmission is in high speed forward with free-wheeling with a series of external clutch teeth 45 on the periphery of the rearward member 28 of the cage 10. The extension 40 also has a series of external clutch teeth 46 in radial alinement with the teeth 44, the external teeth 46 cooperating when the transmission is in low speed forward with free-wheeling with a series of internal clutch teeth 47 on a lock yoke 48, which yoke 48 is adapted to lock the ring gear 34 against rotation.

The lock yoke 48 is supported to slide axially within the housing on a pair of diametrically opposite parallel rods 49 disposed in a horizontal plane through the axis of the driving member 9 and externally of the opposite sides of the externally toothed portion of the extension 40. The opposite ends of the lock yoke 48 are provided with suitable sockets 50 to receive the generally ball-like ends 51 of a lock yoke shifter fork 52 (Figure 2). The shifter fork 52 has a hub 53 pinned upon a shifter rod 54 and the hub 53 has a suitable socket 55 to receive the end of a shift lever as is well understood by those skilled in the art. Such a lever is shown, more or less diagrammatically, in Figure 1 at 56, and its lower end is swingable laterally of the housing of the transmission to be engaged selectively with the socket 37 or the socket 55, and generally longitudinally to shift selectively the rod 25 or the rod 54 axially, as desired.

As shown in Figure 4, the inner periphery of the rearward end of the cage member 28 has a plurality of tapering pockets 58, each pocket being of increasing radial depth in a direction corresponding with the direction of free rotative movement of the member 11 with respect to the member 28. Disposed in the pockets 58 are clutch rollers 59 which are free to roll endwise of the pockets.

The rollers 59 are rotatable upon pins 60 and are tied together by securing the opposite ends of these pins in annular end rings 61 and 62, as shown. The inner marginal edge of the ring member 61 engages in the groove formed by reducing the forward end of the member 11 and is free to turn between the members 11 and 28, at the same time being held against appreciable endwise movement with respect to these members. The ring member 62 is free to turn between the clutch disc part 43 of the member 11 and the adjacent part of the member 28 and the periphery of the ring 62 projects from the outer periphery of the member 28 and is toothed at 63.

The internal clutch teeth 44 on the ring gear 34 are tapered rearwardly at 64 (Figure 11) and the teeth 63 on the ring member 62 are correspondingly tapered in a forward direction so that, as the ring gear 34 is shifted rearwardly to engage the teeth 44 with the teeth 42 for reverse, the ring member 62 and the rollers 60 and ring member 61 joined together and constituting a unitary assembly, will be turned about its axis sufficiently to release the clutch rollers 60 from clutching engagement with the surfaces 58' and 58'' (Figure 4) thereby rendering the free-wheeling device inoperative in reverse. With the teeth 44 in engagement with the teeth 42 the forward ends of the teeth 44 may continue in engagement with the teeth 63 to hold the free-wheeling device out of operation until the transmission is shifted out of reverse. The parts are preferably correlated to avoid frictional wear between the parts.

The inner race of the bearing 13 is held between a shoulder on the member 11 and the hub of the companion driving flange 68 which may be connected through a suitable joint, flexible or otherwise, to a propeller shaft or the like. The hub of the driving flange 68 is splined upon the member 11 at 69 and is held to the splined shaft section 11 by means of the nut 70 threaded on a reduced extension of the shaft 11. A ring member 71 is threaded to the sleeve 72 on the wall or web 15, as shown, and an oil-tight seal 73 seals the annular space between the inner periphery of the ring member 71 and the outer periphery of the hub of the flange 68.

The rearward extension of the ring gear 34 has openings 75 for free passage of the lubricant into the ring gear 34 and to the wearing parts. A drain plug is provided at 76.

The operation of the device thus far described is as follows:

With the parts in the positions shown, the ring 34 is clutched to and held against rotation by engagement of the teeth 46 with the teeth 47 of the lock yoke 48, with the result that rotation of the driving member 9 rotates the rearward cage part 28 at reduced speed through the pinions 32 and pins 33. This low speed forward drive is, in turn, transmitted to the driven member 11 through the clutch rollers 60 and from the driven member 11 the drive is transmitted to the propeller shaft or other member through universal connection of the driving flange 68 therewith. If the component of the force of gravity in a direction parallel to the road surface on a down grade or force due to the momentum of the car tends to make it travel at a higher speed than that corresponding to the engine speed, the arrangement of the clutch rollers 60 between the members 11 and 28 will permit the member 11 to over-run the member 28. When the shifter rod 54 and lock yoke shifter fork 52 are shifted rearwardly to position the lock yoke 48, as shown in dotted lines in Figure 1, the teeth 47 are disengaged from the teeth 46 and then, since the member 34 is free, the drive is interrupted.

In order to obtain high speed or direct drive with free-wheeling, the lower end of the shift lever 56 is swung laterally into engagement with the socket 37, and then by shifting the rod 25 the ring gear is shifted to a position where the teeth 44 are engaged with the teeth 45 but without engaging the teeth 41 with the teeth 42. The ring gear 34 is then clutched to the rearward cage member 28, as shown in Figure 6, and the ring gear 34, cage member 28, gears 32 and pinion 18 are locked together for direct or one-to-one ratio drive from the shaft 9 to the member 28. This direct drive is, in turn, transmitted to the driven member 11 through the clutch rollers 60 from which member 11 the drive may be transmitted as before. With the parts in this position, the arrangement of clutch rollers 60 between the members 11 and 28 permits the member 11 to over-run the member 28 when the movement of the vehicle exceeds the speed of the engine with the transmission in high.

Where it is desired to render the free wheeling device inoperative with the transmission in direct, the ring 34 is shifted forwardly further to engage the teeth 41 with the teeth 42. The teeth 44 on the ring gear are wide enough to permit the ring gear to be shifted forwardly a sufficient distance to engage the teeth 41 with the teeth 42 without disengaging the teeth 44 from the teeth 45. As shown in Figure 7, the members 28 and 11 are now positively connected together, and the ring gear 34 being clutched to the cage member 28 a positive direct drive without free-wheeling is provided from the driving shaft 9 to the driven shaft section 11.

As already explained, reverse drive is obtained by shifting the ring gear 34 rearwardly to engage the teeth 44 with the teeth 42, as shown in Figure 8. And as the ring gear is shifted to this position, the engagement of the tapered ends 64 of the teeth 44 with the tapered ends of the teeth 63 turn or rotate the roller and ring assembly 60, 61 and 62, sufficiently to position and to hold the rollers 60 out of position for clutching action, whereby free-wheeling is not only rendered inoperative in reverse drive through the transmission, but is rendered inoperative by the shifting movement which places the transmission in reverse.

In order to provide for low speed forward without free-wheeling, I provide the forward end of the member 11 with three longitudinal openings 80, preferably equally spaced about the axis of the driven member 11, and opening endwise through and from the opposite ends of the enlarged forward end of the member 11. The adjacent face of the cage member 28 has three similarly spaced sockets 81 and pins 82 are slidable axially in the openings 80 to be brought forwardly for engagement in the sockets 81 to connect the members 28 and 11 positively for low speed forward drive without free-wheeling.

The rear ends of the pins 82 have axial threaded recesses 83 to receive screws 84, the shanks of which are threaded into the recesses 83 and provided at their opposite ends with heads 85. A shifter ring 86, split at 87, is secured to the pins 82 by the screws 84. This pin and screw arrangement permits convenient assembly of the pins 82 and shifter ring 86 in connected relation. Peripherally, the ring 86 has a groove 87' in which engage pins 87'' at the lower ends of the arms of a forked shifter lever 88 pivoted at 89. The lever 88 is of bell-crank form and connected to the free end of its opposite arm is an actuating connection which may be in the form of a Bowden wire 90 provided at its outer end with a button or finger piece 91. The button or finger piece 91 may be located on the steering wheel or otherwise arranged in position conveniently accessible to the driver, and by manipulating it the pins 82 are thrust forwardly into position to engage in the sockets 81 to provide low speed forward without free-wheeling, or rearwardly to position clear of the member 28 for high and low speeds forward with free wheeling.

The button 91 has a projection 93 pivoted at 94 to the Bowden wire element 90 and notched at 95 to be engaged with the plug or ferrule element 96, as shown in dotted lines in Figure 5, to hold the pins 82 in retracted position. As shown in Figure 10, the socketed face of the member 28 has inclined ways 97 entering the sockets 81 counter to the direction of travel of the member 28 when it drives the member 11 in low speed forward, these inclined ways assuring engagement of the pins 82 in the sockets 81 as they are projected forwardly from the forward end of the member 11. A coiled spring at 110 (Figures 1 and 5) cooperates with the collar 86 to urge yieldingly the pins 82 toward forward projected position in engagement with sockets 81.

In order to obtain low speed forward without free-wheeling the button 91 is released and moved from its dotted line position to its full line position (Figure 5) thrusting the pins 82 forwardly into engagement with the sockets 81. The driving member 9 then rotates the cage part 28 at reduced speed through the pinions 32 and pins 33, the ring gear 34 being held against rotation by the lock yoke at this time. This low speed forward drive is, in turn, transmitted from the member 28 to the member 11 through the clutch pins 82 without free-wheeling, and from the driven member 11 the drive is transmitted to the propeller shaft or other member, as before.

Figure 2:
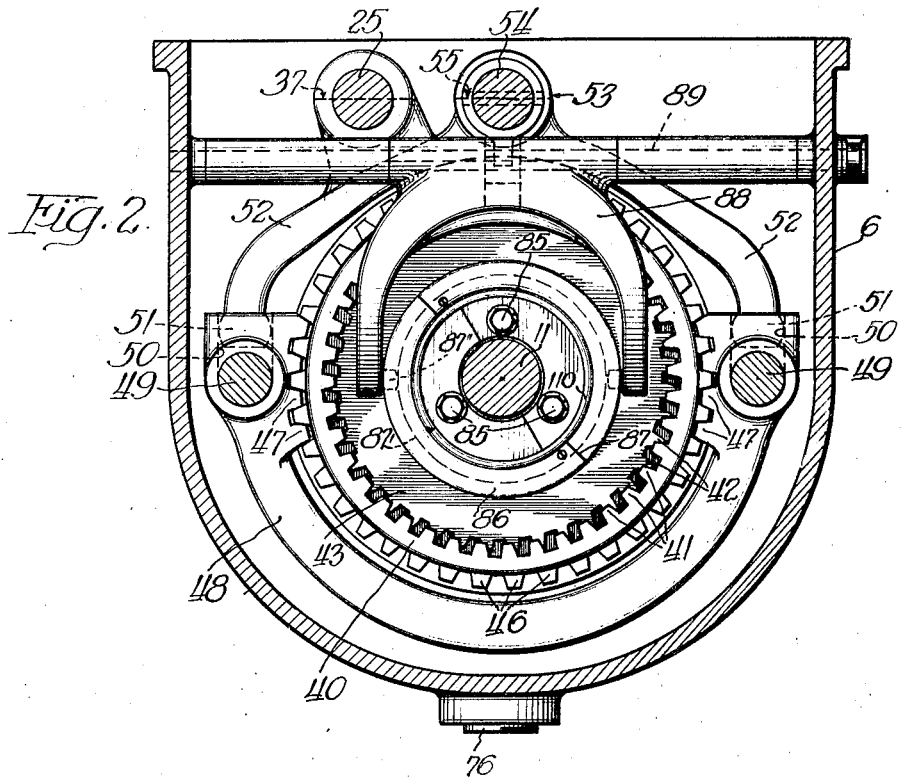
Figure 2 is a cross-sectional view taken on the line 2—2 of Figure 1.

In the illustrated embodiment, the propeller shaft 98 is coupled to the two speed axle, indicated diagrammatically at 99 in Figure 1.

When the ring gear 34 is shifted forwardly to engage teeth 44 with teeth 45 without engaging teeth 41 with teeth 42 to provide high speed forward, free-wheeling in this speed is obtained by disengaging the pins 82 from the sockets 81. Although I have referred to obtaining high speed forward without free-wheeling by positioning the ring gear 34, as shown in Figure 7, it is to be understood that the clutch pins 82 and sockets 81 may be used in high speed forward without free-wheeling. In that case, the ring gear 34 is positioned as shown in Figure 6 and the clutch pins 82 are projected into engagement with the sockets 81 to connect directly and positively the members 28 and 11. Of course, where the pins 82 are used in high speed forward without free-wheeling, as well as in low speed forward without free-wheeling, the teeth 41 on the ring gear 34 may be omitted.

As the shifter rod 25 is moved rearwardly to engage the teeth 44 with the teeth 42 for reverse, the holding dog 24 is carried with the rod 25 and engages the teeth 23 on the clutch disc 22, holding the cage 10 stationary and the drive then proceeds from the pinion 18 through the idlers 32 which rotate on the stationary pins 33 driving the ring gear 34 and the driven member 11 in reverse direction.

It will be understood that the shifting of the rods 25 and 54 is preferably accompanied by disengagement of the driving clutch as is the case in the usual change speed transmission.

In order to assure disconnection of the members 28 and 11 as the transmission is shifted into reverse the rod 25 is provided with a collar 125 movable therewith. In moving the rod 25 rearwardly to shift the transmission into reverse this collar 125 engages a finger or arm 126 on the lever 88 and shifts the pins 82 out of engagement with the sockets 81 automatically by the shifting of the transmission into reverse and preferably ahead of engagement of the teeth 44 with the teeth 42.

The driving ratios which are secured in the transmission above described are as follows:

For low speed forward with and without free-wheeling, as shown in Figure 1, the drive is the ratio produced by the turning movement imparted to the member 28 by the planetary movement produced in the pins 33 by the driving engagement of the pinion 18 with the idlers 32 and the meshing of these idlers with the ring gear 34 which is held stationary at that time. The reverse drive is the ratio produced by the rotation of the idlers 32 and the rotation imparted to the ring gear 34 thereby with the pins 33 held against turning about the axis of the driving member 9. In high speed forward, with and without free wheeling, the drive is direct or in one-to-one ratio.

As already explained, it will be seen that the axially shiftable clutch pins 82 may be used not only for providing a positive connection between the members 28 and 11 in low speed forward, but may be used also to provide a positive connection between the members 28 and 11 in high speed or direct drive forward. Therefore, the teeth 41 and the position of the ring gear 34 in which these teeth 41 are engaged with the teeth 42, with the teeth 44 in engagement with the teeth 45, may be omitted. These two positive connecting arrangements may be employed, however, in the same transmission, one for providing a positive connection in high speed forward and the other for providing a positive connection in low speed forward, and both are shown in that relation to impart a clear understanding of the illustrated embodiment of the invention.

I claim:

1. In combination, a driving member having a pinion, a driven member, an intermediate member, idlers carried by the intermediate member, a ring gear embracing the idlers, means for holding the ring gear stationary in one position and to said intermediate member in a second position, free-wheeling means between said intermediate member and said driven member, and means for holding said ring gear to both said intermediate member and said driven member for direct drive without free-wheeling in a third position of said ring gear.

2. In combination, a driving member having a pinion, a driven member, an intermediate member, idlers carried by the intermediate member, a ring gear embracing the idlers, means for holding the ring gear stationary in one position and to said intermediate member in another position, free-wheeling means between said intermediate member and said driven member, and means on said ring gear for positively connecting said intermediate member and said driven member to drive without free-wheeling with said ring gear held to said intermediate member.

3. In combination, a driving member having a pinion, a driven member, an intermediate member, idlers carried by the intermediate member, a shiftable ring gear embracing the idlers, means for holding the ring gear stationary in one position and to said intermediate member in another position, free-wheeling means between said intermediate member and said driven member, means for positively connecting said intermediate member and said driven member to drive without free-wheeling with said ring gear in stationary position and in position held to said intermediate member, said means including a peripherally toothed clutch disc on the driven member and clutch teeth shiftable with the ring gear.

4. In combination, a driving member having a pinion, a driven member, an intermediate member, idlers carried by the intermediate member, a ring gear embracing the idlers, means for holding the ring gear stationary in one position and to said intermediate member in another position, free-wheeling means between said intermediate member and said driven member, teeth on the intermediate member, teeth on the driven member, and longitudinally spaced sets of teeth on the ring gear, the forward set being engageable with the teeth on the intermediate member without engaging the other set with the teeth on the driven member and the other set of teeth on the ring gear being engageable with the teeth on the driven member by further forward movement of the ring gear and without disengaging the forward set of teeth on the ring gear from the teeth on the intermediate member.

5. In combination, a driving member having a pinion, a driven member, an intermediate member, idlers carried by said intermediate member, a ring gear embracing the idlers, means for holding the ring gear stationary in one position and to said intermediate member in another position, clutch teeth on said driven member, clutch teeth on the ring gear engageable with the clutch teeth on the driven member in a third position of said ring gear, and free-wheeling means between said driving and driven members, said free-wheeling means being rendered inoperative by engagement of the clutch teeth on the ring gear with the clutch teeth on the driven member.

6. In combination, a driving member having a pinion, a driven member, an intermediate member, idlers carried by said intermediate member, a ring gear embracing the idlers, means for holding the ring gear stationary in one position and to said intermediate member in another position, the means for holding said ring gear stationary comprising clutch teeth on the ring gear and a lock yoke embracing a substantial portion of the ring gear and having teeth engaging with the teeth on the ring gear at diametrically opposite sides of the ring gear in one position of said lock yoke and disengaged from the teeth on said ring gear in another position of said yoke and a pair of diametrically opposite rods slidably supporting said lock yoke.

7. In a device of the class described, a free-wheeling roller assembly comprising a roller cage including a pair of ring members, pins extending between and secured at opposite ends to said ring members, and rollers rotatable on said pins, one of said ring members having a toothed periphery.

8. In a device of the class described, a free-wheeling roller assembly comprising a roller cage including a pair of ring members, pins extending between and secured at opposite ends to said ring members, rollers rotatable on said pins, one of said ring members having a toothed periphery and the teeth on the periphery of said ring member having angular portions longitudinally thereof.

9. In combination, a driving member, a driven member, a free-wheeling device between said members, clutch teeth on said driven member, and a shiftable member having clutch teeth adapted to engage the clutch teeth on said driven member, said free-wheeling device comprising rollers and a roller cage having means projecting into the path of movement of the clutch teeth on the shiftable member.

10. In combination, a driving member, a driven member, a free-wheeling device between said members, clutch teeth on said driven member, and a shiftable member having clutch teeth adapted to engage the clutch teeth on said driven member, said free-wheeling device comprising rollers and a roller cage having means projecting into the path of movement of the clutch means on the shiftable member, the projecting means on said roller cage having teeth with angular side faces and the teeth on said shiftable member having angular side faces cooperating with the angular side faces of the teeth on said projecting means for throwing the rollers out of engagement upon engagement of the clutch means on the shiftable member with the clutch means on said driven member.

11. In combination, a driving member, a driving pinion thereon, a driven member, a cage about the driving pinion having idlers meshing with the pinion, an internal gear member meshing with said idlers and shiftable into different positions, a free-wheeling device between the cage and the driven member and operative in at least one position of said internal gear member, and means providing for direct clutching engagement between the internal gear member and the driven member in another position of said gear member for rendering said free-wheeling device inoperative.

12. In combination, a driving shaft, a driving pinion thereon, a driven shaft, a cage about the driving pinion having idlers meshing with the pinion, an internal gear meshing with said idlers, a free-wheeling device between the cage and the driven shaft, and means for selectively clutching the internal gear to the cage with the internal gear free of the driven shaft and for clutching the internal gear to the cage and to the driven shaft simultaneously.

13. In combination, a driving shaft, a driving pinion thereon, a driven shaft, a cage about the driving pinion having idlers meshing with the pinion, an internal gear meshing with said idlers, a free-wheeling device between the cage and the driven shaft, means for selectively clutching the internal gear to the cage and the cage to the driven shaft, and a lock yoke shiftable to one position for locking the internal gear against rotation and into another position for freeing the internal gear and interrupting the drive.

14. In combination, a driving shaft, a driving pinion thereon, a driven shaft, a cage about the driving pinion having idlers meshing with the pinion, an internal gear meshing with said idlers, a free-wheeling device between the cage and the driven shaft, means for selectively clutching the internal gear to the cage and the cage to the driven shaft, a lock yoke shiftable to one position for locking the internal gear against rotation and into another position for freeing the internal gear and interrupting the drive, and clutch means on the driven shaft and clutch means on the internal gear shiftable into and out of engagement with the clutch means on the driven shaft for reverse drive, said free-wheeling device comprising rollers and a roller cage having a toothed flange projecting into the path of movement of the clutch means on the internal gear.

15. In combination, a driving shaft, a driving pinion thereon, a driven shaft, a cage about the driving pinion having idlers meshing with the pinion, an internal gear meshing with said idlers, a free-wheeling device between the cage and the driven shaft, means for selectively clutching the internal gear to the cage and the cage to the driven shaft, a lock yoke shiftable to one position for locking the internal gear against rotation and into another position for freeing the internal gear and interrupting the drive, clutch means on the driven shaft and clutch means on the internal gear shiftable into and out of engagement with the clutch means on the driven shaft for reverse drive, said free-wheeling device comprising rollers and a roller cage having a toothed flange projecting into the path of movement of the clutch means on the internal gear, and clutch means for connecting the cage to the driven shaft without free-wheeling.

16. In combination, a driving shaft, a driving pinion thereon, a driven shaft, a cage about the driving pinion having idlers meshing with the pinion, an internal gear meshing with the idlers, a free-wheeling device between the cage and the driven shaft, clutch teeth on the cage, clutch teeth on the driven shaft, and clutch teeth on the internal gear and having neutral and ratio forward drive positions between said first clutch teeth and movable in one direction into engagement with the clutch teeth on the cage and in the other direction into engagement with the clutch teeth on the driven shaft.

17. In a transmission for motor vehicles, a drive shaft, a driven shaft, means for connecting said shafts for a forward ratio drive and for reverse drive and for locking the drive and driven shafts and the entire connecting means for direct forward drive, said means including a ring gear having external teeth thereon, a lock yoke of semi-circular shape extending about a substantial portion of said ring gear and having teeth for engagement with the external teeth of said ring gear at diametrically opposite positions for locking said ring gear against rotation, and means receiving the opposite ends of said yoke for lateral sliding movement thereon and non-rotatively supporting said yoke in position about said ring gear.

18. In combination, a driving member, a driven member, change speed gearing between said members, said change speed gearing including a shiftable gear member, means on said gear member for cooperation with means on another of said members to effect a driving connection therebetween, free-wheeling means between said driving and driven members, and means on said free-wheeling means for engagement with the driving connection effecting means on the gear member in advance of the driving connection effecting position of said means to render the free-wheeling means inoperative.

19. In combination, a driving member, a driven member, change speed gearing between said members including an internal gear ring sleeve, free-wheeling means between said driving and driven members, and means for shifting said sleeve into a position relative to said driven member such as to effect direct driving relationship between said driving and driven members for rendering said free-wheeling means inoperative.

20. In a change speed and reversing transmission, a drive member, a driven member, means for driving said driven member from said drive member comprising an enclosing shiftable sleeve, an intermediate connecting member, said sleeve being shiftable into position to effect locking of said intermediate member relative to said drive member, free-wheeling means between said intermediate member and said driven member, manually operable means for clutching said driven member directly to said intermediate member to render said free-wheeling means inoperative, and means for shifting said sleeve into a position relative to said driven member to effect direct driving relationship between said driving member and said driven member including means for locking said intermediate member against rotation to effect reversing of the transmission, said free-wheeling means being automatically rendered inoperative upon the shifting of said sleeve into said latter position.

THOMAS L. FAWICK.